E. B. CARPENTER.

Organ Coupler.

No. 9,686. Reissued May 3, 1881.

*Attest;*
F. W. Howard
John C. Schroeder.

*Inventor;*
Edwin B. Carpenter
by Dyer & Weber
Attys.

N. PETERS, Photo-Lithographer, Washington, D. C.

UNITED STATES PATENT OFFICE.

EDWIN B. CARPENTER, OF MENDOTA, ILLINOIS.

ORGAN-COUPLER.

SPECIFICATION forming part of Reissued Letters Patent No. 9,686, dated May 3, 1881.

Original No. 152,599, dated June 30, 1874. Application for reissue filed December 28, 1880.

*To all whom it may concern:*

Be it known that I, EDWIN B. CARPENTER, of Mendota, La Salle county, Illinois, have invented a new and useful Improvement in Organs and other Similar Reed-Instruments, of which the following is a full description, reference being had to the accompanying drawings.

My invention relates to an improvement in octave-couplers for reed-instruments, and especially to that class which are provided with levers connecting given keys with their octaves.

My object is to provide a more simple and effective means than has heretofore been done for coupling octaves up and down from any given point, and be so coupled, either up or down separately, or both up and down at the same time; and to that end it consists, first, in the peculiar construction and arrangement of a series of levers, in combination with a fulcrum-bar of peculiar construction and arrangement; and, second, in the combination, with such levers and fulcrum-bar, of a peculiar means for operating the same, all as more fully hereinafter set forth and claimed.

To enable persons skilled in the art to know how to make and use my invention, I will now proceed to fully describe the same, reference being had to the accompanying drawings, in which—

Figure 1:
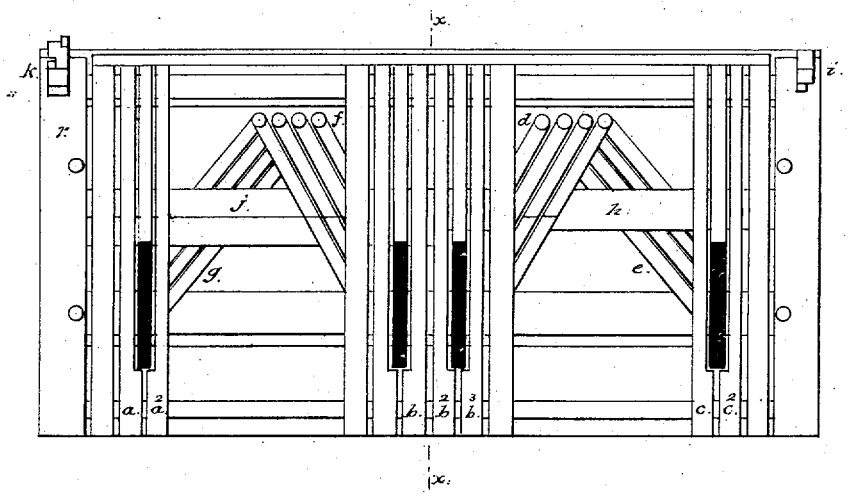
Figure 2:
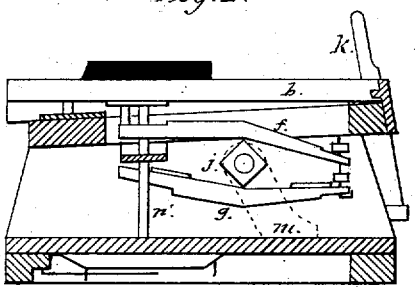
Figure 3:
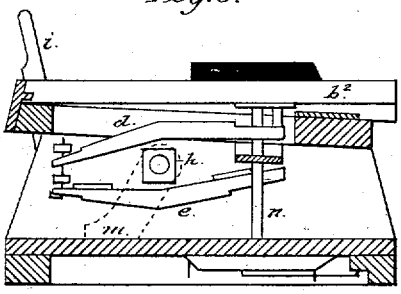
Figure 5:
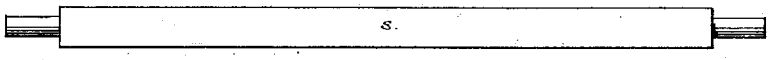
Figure 4:
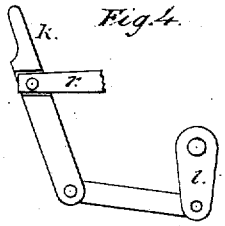

Figure 1 is a top-plan view, showing a part of the keys removed; Fig. 2, a vertical cross-section on line *x*, looking to the left; Fig. 3, a similar section, looking to the right; Fig. 4, a detail view, showing a system of levers used in operating the coupler; Fig. 5, a variation, showing the two bars or stops *h j*, made of a single piece instead of in two pieces.

Like letters denote corresponding parts in each figure.

In the drawings, $a$ $a^2$ $b$ $b^2$ $c$ $c^2$ represent the keys of the instrument; *d e*, the levers connecting two keys, the one an octave above the other; and *f g* similar levers connecting the keys next below the given point *x*, an octave below.

*h* is a square bar or stop, by the use of which the levers *d e* can be brought into action or thrown out of action, as may be desired. *j* is a similar bar or stop, to be used in bringing the levers *f g* into action or to throw them out of action. The outer ends of both these bars or stops are supported in the sides of the instrument, and their inner ends in a bearing, *m*, located within the instrument at or about the center, as represented by dotted lines in Figs. 2 and 3. These bars or stops *h j* are made square, *h* passing between the levers *d e*, and *j* between the levers *f g*.

The bar or stop *h* is operated by a system of levers, as usual, one of which, *i*, is shown in Fig. 3. The bar *j* is operated by similar levers, one of which is shown in Fig. 2. In Fig. 4, I have shown in detail the connection of such levers, *k* being pivoted near its upper end to *r*, which is a part of the frame, and its lower end connected to a lever, which is, in turn, connected to the lever *l*.

The outer end of the bar or stop *j*, passing through its bearing on the side of the instrument, is connected to the lever *l* at its upper end. The lever *i*, with its connecting-levers, is secured to the outer end of the stop *h* in a similar manner.

When it is desired by the performer to couple the notes an octave above the given point *x*, he draws the lever *i* in toward him, thereby throwing the bar or stop *h* into the position shown in Fig. 2, its corners furnishing a fulcrum for the levers *d e*. Immediately that a key is pressed down above the point *x*, the end of the lever that connects with such key is also pressed down, and its end connecting with the lever of the octave-key is, in turn, drawn up, and consequently its end connected to the octave-key is drawn down at the same time that the key pressed is, thereby producing double the strength of tone and an octave higher in pitch.

When it is desired to uncouple the keys, the performer presses the lever *i* out from him, thus turning the plain face of the bar or stop to the levers *d e*, and leaves them without a bearing to act on, as shown in Fig. 3; consequently, when a key is touched, its octave is not in the least affected.

The bass, or the part below the point *x*, is operated the same as the treble or part above the point *x*, when it is desired to couple with the octave lower than the key pressed.

When it is desired to couple both the bass and the treble at the same time, both the levers $k$ and $i$ are operated together at the same time.

As represented, $b^2$ is connected with the key $c$ an octave above $b^2$ by the levers $d$ $e$. The key $b^3$ is connected with $c^2$ by similar levers, and so on through the octave, only a portion of which is shown; also, $b$ is connected with $a^2$ an octave below by means of the levers $f$ $g$, and so on through the octaves, a portion of which only is shown.

As above mentioned, when $h$ is in the position shown in Fig. 3, the levers $d$ $e$ will not act, but if brought in the position in which $j$ is shown in Fig. 2 the corners of said bar furnish fulcrums for the levers $f$ $g$.

$n$ $n'$ represent two of the rods or pins through which the valves which cover the reeds are operated or opened by pressing the keys as usual.

As represented and so far described, the two bars or stops $h$ $j$ are entirely separate from each other, and either can be operated without the other, so that the levers $f$ $g$ can be in use while $d$ $e$ will not be in use, as shown in Fig. 1; or $d$ $e$ may be in use and $f$ $g$ not in use, or both series, $d$ $e$ and $f$ $g$, may be in use at the same time.

This construction enables the player to strengthen either the treble only, or only the bass, or both treble and bass at pleasure, thus securing greater variety, and more perfectly adapting the instrument to the expression of different kinds of mnsic.

The advantage of coupling both above and below a given point at the same time can be secured by making the parts $h$ $j$ of a single piece, forming a single bar or stop, $s$, as shown in Fig. 5. When thus constructed one hand-lever only is required to be used; but when so made the connection cannot be either only above or only below the given point.

What I claim, and desire to secure by Letters Patent, is—

1. The series of levers $d$ $e$ and $f$ $g$, arranged to couple up and down from any given point, substantially as described, in combination with the divided fulcrum-bar $h$ $j$, constructed and arranged substantially as and for the purpose set forth.

2. In combination with the divided fulcrum-bar $h$ $j$, and levers $d$ $e$ and $f$ $g$, passing respectively over and under said bar, the levers $i$ $k$, connected to said bar for the purpose of throwing said bar into position to act as a fulcrum for the levers $d$ $e$ $f$ $g$, substantially as described.

EDWIN B. CARPENTER.

Witnesses:
L. B. CROOKER,
H. C. MCINTIRE.